Aug. 29, 1933.   L. D. LOVEKIN ET AL   1,924,869
PROTECTION VALVE DEVICE FOR WATER METERS AND THE LIKE
Filed March 11, 1932
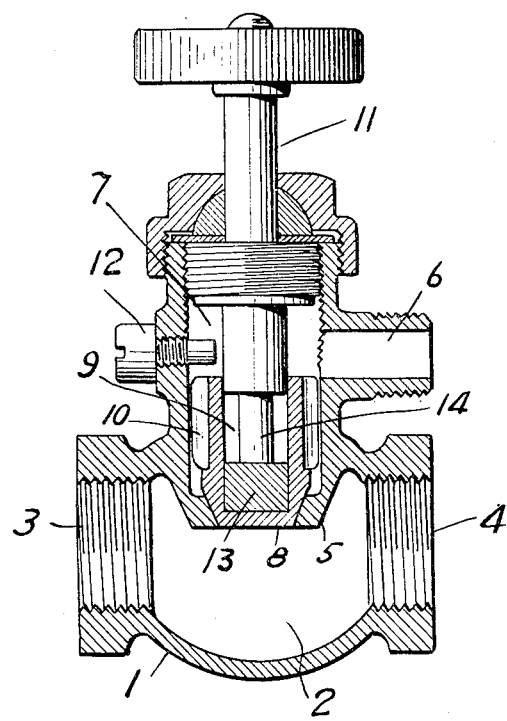
INVENTORS
Luther D. Lovekin
Jean L. Le Gorre
BY
Augustus B. Stoughton
ATTORNEY.
WITNESS:

Patented Aug. 29, 1933

1,924,869

UNITED STATES PATENT OFFICE 1,924,869

PROTECTION VALVE DEVICE FOR WATER METERS AND THE LIKE

Luther D. Lovekin, Villanova, and Jean L. Le Gorre, Philadelphia, Pa., assignors to Kitson Company, Philadelphia, Pa., a corporation of West Virginia Application March 11, 1932. Serial No. 598,116

2 Claims. (Cl. 137—161)

The principal objects of the present invention are to provide a valve device of the type recited, which after automatic opening can be reset or serviced for future automatic operation by the simple operation of closing it; and to provide for properly confining the fusible element which holds the valve normally shut in such a way that when fused to permit the valve to open, the fusible element cannot escape from its position so that when it again hardens it is in position to be available for shutting and holding the valve shut.

Other objects of the present invention will appear from the following description at the end of which the invention will be claimed.

Generally stated, the invention comprises a valve device adapted to normally hold a spillway closed and to automatically permit the spillway to open under rise in temperature of the water flowing through it, and having a spillway valve biased to open position by water pressure and held to closed position by a body of metal fusible under rise in temperature and interposed between the valve and valve spindle, and having means for confining the fusible body, when fused, to keep it in position for future use in closing the valve and for further automatic operation.

More specifically the invention comprises, in such a device, the provision of a sleeve valve movable in the spillway of the fitting and having a cavity, a valve spindle movable in the sleeve of the valve and having a projection extending into the cavity, a limit stop for the valve, and a body in the cavity and under the projection and fusible under rise in temperature.

The invention also comprises the improvements to be presently described and finally claimed.

The single figure of the drawing is a central sectional view of a valve device showing the same in closed position.

In the drawing the fitting 1 is provided with a water way 2. Through the water way 2 water passes from a source of supply through a meter and enters at 3, the water leaving at 4 enters a hot water heater or a connection thereof. Neither the heater nor the meter are shown as they are too well understood to require illustration or description. The fitting 1 is provided with a valve seat 5 opening into a spillway 6 by way of a generally cylindrical chamber 7. 8 is a sleeve valve having within it a cavity 9. The valve is shown as provided with guide fins 10 which work in the cylindrical chamber 7. The valve spindle 11 is of the screw type and a portion of it enters the sleeve valve, or more accurately the cavity therein, and the valve and spindle are relatively movable. 12 is a stop for limiting the extent of movement of the valve away from its seat under the pressure of water in the fluidway 2. 13 is a body of metal adapted to soften or fuse under rise in temperature and to again harden under drop in temperature. In the drawing the valve is shown as held in closed position by the body 13, and the projection 14 on the end of the valve spindle which rests upon the body. The chamber 9 is closed by the valve spindle.

If the temperature of the water in the fluidway 2 rises as by heat from the boiler, it is undesirable that the hot water should reach the meter by way of the opening 3. The rise in temperature of the water in the fluidway 2 raises the temperature of the body 13 so that it fuses or softens. The valve 8 opens under water pressure until it is stopped by the stop 12. Hot water therefore passes the valve and escapes at the spillway 6. Since the cavity 9 in the valve is closed by the valve spindle and sleeve of the valve, none of the fusible body 13, which is confined within the cavity, can escape from the cavity, although the projection 14 enters the fusible body. Cold water entering at 3 reduces the temperature of the body 13 and so solidifies it. To service the valve device and close the spillway 6, all that is necessary is to screw the valve spindle 11 inward causing its projection 14 operating on the body 13 to close the valve 8, and this described operation may be repeated until it becomes necessary to remove the body 13 and provide a new one.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. In a valve device of the type described the combination of a casing having a water way and a spillway including a generally cylindrical chamber, a sleeve valve having a cavity and movable in said chamber and biased to open position by water pressure in the water way, a screw valve spindle in respect to which the sleeve of the valve is slidable and which is provided with a projection, a limit stop for the valve, and a body fusible upon rise in temperature and arranged between the valve and projection and confined by the sleeve of the valve and the valve spindle.

2. In a device of the type described the combination of a valve spindle having a projection, a sleeve valve slidable on the valve spindle, a stop for limiting the opening movement of the valve, and a body fusible under rise in temperature and interposed between the valve and projection and confined in the valve by the sleeve thereof and by the spindle.

LUTHER D. LOVEKIN.
JEAN L. LE GORRE.